United States Patent
Esmaili et al.

(10) Patent No.: US 8,300,880 B2
(45) Date of Patent: Oct. 30, 2012

(54) SYSTEM AND METHOD FOR TEMPERATURE DATA ACQUISITION

(76) Inventors: Ali Esmaili, Emmaus, PA (US);
Xianming Jimmy Li, Orefield, PA (US);
William Robert Licht, Allentown, PA (US); Kevin Boyle Fogash, Wescosville, PA (US); Oliver Jacob Smith, IV, New Tripoli, PA (US); Blaine Edward Herb, New Tripoli, PA (US); Thomas Joseph Bzik, Macungie, PA (US)

( * ) Notice: Subject to any disclaimer, the term of this patent is extended or adjusted under 35 U.S.C. 154(b) by 760 days.

(21) Appl. No.: 12/478,858

(22) Filed: Jun. 5, 2009

(65) Prior Publication Data
US 2010/0310113 A1 Dec. 9, 2010

(51) Int. Cl.
*G06K 9/00* (2006.01)
*G01J 5/00* (2006.01)
(52) U.S. Cl. .............................. 382/100; 374/124
(58) Field of Classification Search .................. 382/100; 110/186, 190, 120, 208, 225; 431/12, 37, 431/75; 348/83; 374/124, 127, 30, 35, 100–102; 373/57, 66, 78, 109, 136, 138
See application file for complete search history.

(56) References Cited

U.S. PATENT DOCUMENTS

| | | | | |
|---|---|---|---|---|
| 4,751,571 A * | 6/1988 | Lillquist | ........................ | 348/164 |
| 5,782,770 A * | 7/1998 | Mooradian et al. | ........... | 600/476 |
| 6,612,737 B1 * | 9/2003 | Lobban | ......................... | 374/183 |
| 7,215,358 B2 * | 5/2007 | Lee | ................................ | 348/83 |
| 7,348,562 B2 * | 3/2008 | Irani | ........................ | 250/339.02 |
| 2003/0123518 A1 | 7/2003 | Abbasi et al. | | |
| 2004/0236229 A1 | 11/2004 | Freeman et al. | | |
| 2005/0267703 A1 | 12/2005 | Bondurant et al. | | |
| 2006/0050147 A1 | 3/2006 | Gao et al. | | |
| 2007/0056004 A1 | 3/2007 | Rose et al. | | |
| 2007/0104641 A1 | 5/2007 | Ahmed et al. | | |

FOREIGN PATENT DOCUMENTS
EP 0 423 905 A2 4/1991

OTHER PUBLICATIONS

Hill, T., et al., "On-Line Optimizatin and Reliability Monitoring of Your synthesis gas Plant: Fact or Fiction", Quest Reliability, Johnson Matthey Catalysts.
Saunders, Peter, et al., "Determination of Reformer—Tube Temperature by Means of a CCD Camera", High Temperatures—High Pressures, 1999, vol. 31, pp. 83-90.

* cited by examiner

*Primary Examiner* — Abolfazl Tabatabai
(74) *Attorney, Agent, or Firm* — Bryan C. Hoke, Jr.

(57) ABSTRACT

A system and method is disclosed for acquiring temperature data from a plurality of features in a chamber including capturing a first image of an interior area of the chamber, capturing a second image of the interior area of the chamber, identifying a plurality of features within the data for the first image and the data for the second image, generating an interior area representation based on the first image data, the second image data, and the identification of each feature of the plurality of features in the interior area, and correlating the interior area representation to temperature information related to the interior area.

17 Claims, 3 Drawing Sheets

SYSTEM AND METHOD FOR TEMPERATURE DATA ACQUISITION

BACKGROUND

The present disclosure is directed to temperature data acquisition in areas with complex geometric features. In particular, the present disclosure is directed to temperature data acquisition on process tubes in a furnace.

Generally, energy efficiency for industrial processes is becoming more important. For many processes, such as hydrogen production, the efficiency of the process is related to the ability to monitor/maintain certain temperatures. Measuring temperature in areas with complex geometric features can present several challenges. For example, when measuring temperatures at specific locations of the features, inconsistency in taking the measurements at the specific location on the feature can result in inconsistent measurements. More precise monitoring of the temperature at the specific location on the feature can permit improved energy efficiency by permitting more accurate data to be used for process control.

One area having complex geometric features is a furnace (including, but not limited to, a steam methane reformer). One type of furnace can utilize numerous process tubes (including one configuration that has more than 400 process tubes) containing a catalyst (for example, a reforming catalyst) for transporting a process fluid (for example, steam and a hydrocarbon). The furnace, in one example, can include vertically extending process tubes positioned in parallel rows with about 30 to 60 tubes in each row. The distance between two rows of tubes is about 2 to 3 meters. The tubes can extend vertically about 12 meters and have an outer diameter of 100 to 150 millimeters. The tubes can be positioned in the row with a center-to-center spacing of 250 to 500 mm. About 10 to 20 burners can be positioned between each set of two rows of tubes. A total of eight or more rows of tubes and nine or more rows of burners can be included in the furnace.

One way to improve the efficiency of a furnace is to maintain a uniformity of temperature among the process tubes at a predetermined elevation in the furnace. Thus, the measuring or monitoring of the temperature of each of the process tubes at a predetermined location or elevation can be needed to obtain the desired efficiency improvement. In addition, the process tubes of a furnace can be under very high internal pressures (up to about 50 atmospheres) and at very high temperatures (up to about 950° C.). Thus, a slight change in temperature can reduce the operational life of a process tube. For example, operating at about 10° C. above the design temperature for the tube can reduce the operational life of the tube by as much as one half. The cost of repairing and/or replacing the tubes can be high due to the use of special alloys in the tubes that are needed to permit the tubes to survive the operational conditions of the furnace. As such, furnace operators also measure/monitor the tube temperatures to avoid exceeding the tube design temperature in addition to trying to obtain efficiency improvements.

In one method of measuring/monitoring the temperature of process tubes, an operator may use an optical pyrometer. When using the optical pyrometer, the operator aims the device at a predetermined location on a process tube and then activates the device. Upon activation, the optical pyrometer measures thermal radiation and displays or records a corresponding temperature for the predetermined location on the process tube. The operator repeats the process for each of the tubes. The use of the optical pyrometer has several drawbacks in that high temperature exposure may occur, the same predetermined location may not be used for all tubes, the temperature of a selected tube may not be measured, the same tube may be inadvertently measured twice instead of the desired adjacent tube, and the process may take too long resulting in temperature fluctuations for the tubes.

Therefore, what is needed is to provide a method for measuring the temperature of complex geometric features using a standardized process that permits quicker data collection.

BRIEF SUMMARY

According to one aspect, the disclosure is directed to a method for determining temperature information on a plurality of tubes in a furnace. The method comprises capturing a plurality of images of an interior area of a furnace. At least some images of the plurality of images are associated with different portions of the interior area of the furnace and each image of the plurality of images includes pixel data associated with a subset of the plurality of tubes positioned inside the furnace. The method also comprises identifying each tube of the subset of the plurality of tubes in each image of the plurality of images, processing a portion of the pixel data associated with each identified tube to obtain a value representing a measure of central tendency for each identified tube of the subset of the plurality of tubes in each image of the plurality of images and processing the value representing the measure of central tendency for each identified tube to obtain temperature information for the plurality of tubes.

Processing the value representing the measure of central tendency for each identified tube may comprise determining a temperature value for each identified tube from the corresponding value representing the measure of central tendency for each identified tube. The method may also comprise establishing a correlation between previously obtained values representing measures of central tendency and corresponding measured temperatures and wherein determining the temperature value for each identified tube from the corresponding value representing the measure of central tendency uses the correlation. The method may further comprise generating a geometric model of the plurality of tubes positioned in the furnace. Alternatively, identifying each tube may comprise identifying an edge of a tube of the plurality of tubes and overlaying a grid on the corresponding image using a geometric model of the plurality of tubes positioned in the furnace and the identified edge of a tube. Overlaying a grid may comprise assigning grid lines to correspond to edges of each tube of the plurality of tubes in the corresponding image. Processing a portion of the pixel data may comprise identifying a segment of the grid corresponding to each identified tube and processing the pixel data associated with the identified segment to obtain the value representing the measure of central tendency for the corresponding identified tube.

Identifying a segment of the grid may comprise identifying segments located at a predetermined elevation of each identified tube. The pixel data may comprise data for a plurality of channels and the processing a portion of the pixel data may comprise processing the data for each channel of the plurality of channels to obtain a channel value for each channel of the plurality of channels. Processing a portion of the pixel data may comprise processing the channel values for the plurality of channels to obtain the value representing the measure of central tendency for the identified tube. Processing the value representing the measure of central tendency for each identified tube may further comprise determining tubes of the plurality of tubes having a plurality of corresponding determined temperature values and processing the plurality of corresponding determined temperature values for each determined tube of the plurality of tubes to obtain a single temperature value for each determined tube. Processing the value representing the measure of central tendency for each identified tube to obtain temperature information may comprise generating a value representing the measure of central tendency for each identified tube at a plurality of elevations.

An additional aspect of the disclosure may comprise correcting for image distortion in each image of the plurality of images and correcting for rotational distortion in each image of the plurality of images. Capturing a plurality of images of an interior area may comprise capturing the plurality of images in a predetermined sequence. A further aspect of the method may comprise displaying the temperature information for the plurality of tubes.

According to another aspect, the disclosure is directed to a method for acquiring temperature data for a plurality of features in a chamber. The method comprises capturing a first image of an interior area of the chamber. The first image is associated with a first portion of the interior area. The first image comprises first image data for the plurality of features positioned within the interior area. The method also comprises capturing a second image of the interior area of the chamber. The second image is associated with a second portion of the interior area. The second image includes second image data for the plurality of features positioned within the interior area. The method further comprises identifying the plurality of features within the first image data and the second image data and generating an interior area representation based on the first image data, the second image data, and the identification of each feature of the plurality of features in the interior area. The interior area representation comprises data relating to the plurality of features positioned inside the interior area. The method also comprises establishing a correlation between the interior area representation and temperature information related to the interior area, and calculating temperatures of the plurality of features in the interior area from the interior area representation using the established correlation.

An additional aspect of the method may comprise generating and displaying a plot of the calculated temperatures. Generating an interior area representation may comprise determining each feature of the plurality of features having a plurality of calculated values, generating a consolidated value for each determined feature of the plurality of features based on the plurality of calculated values for the corresponding determined feature and the interior area representation may comprise the consolidated value for each determined feature of the plurality of features.

Further aspects of the method may comprise associating the first image data to a corresponding identified feature in the first image and calculating a value for each identified feature in the first image using the associated first image data. The chamber may be a furnace and the plurality of features may be a plurality of process tubes. Generating an interior area representation may comprise generating an interior representation at a plurality of elevations within the chamber. Another aspect of the method may comprise generating and displaying a three-dimensional plot of the temperature information.

According to a further aspect, the disclosure is directed to a system to acquire temperature information on a plurality of features in a furnace. The system comprises a device configured to capture a digital image of an interior area of a furnace. The digital image comprises image data on the interior area of the furnace and the interior area of the furnace includes a plurality of features. The system also comprises a computing device having a microprocessor, a memory device and a program executable by the microprocessor. The computing device is configured to receive the image data from the device.

The system further comprises a database storing a relationship between pixel values and temperature values. The microprocessor and program are configured to process the image data to obtain pixel values for each feature of the plurality of features in the digital image and to determine a temperature for each feature of the plurality of features based on the relationship stored in the database.

One advantage of the present disclosure is improved monitoring of process tube temperatures to obtain improved furnace efficiency and to extend the operational life of the process tubes.

Another advantage of the present disclosure is a standardized measuring/monitoring process.

Still another advantage of the present disclosure is to reduce the amount of time that operators are exposed to high temperatures of the furnace.

Still yet another advantage of the present disclosure is improved cost-savings and time-savings for the measuring/monitoring process.

Further aspects of the method and system are disclosed herein. The features as discussed above, as well as other features and advantages of the present disclosure will be appreciated and understood by those skilled in the art from the following detailed description and drawings.

BRIEF DESCRIPTION OF SEVERAL VIEWS OF THE DRAWINGS

Wherever possible, the same reference numbers will be used throughout the drawings to represent the same parts.

DETAILED DESCRIPTION

The present disclosure now will be described more fully hereinafter with reference to the accompanying drawings, in which an exemplary embodiment of the disclosure is shown. This disclosure may, however, be embodied in many different forms and should not be construed as limited to the embodiments set forth herein.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

As used herein, "plurality" means "at least two."

Figure 1:
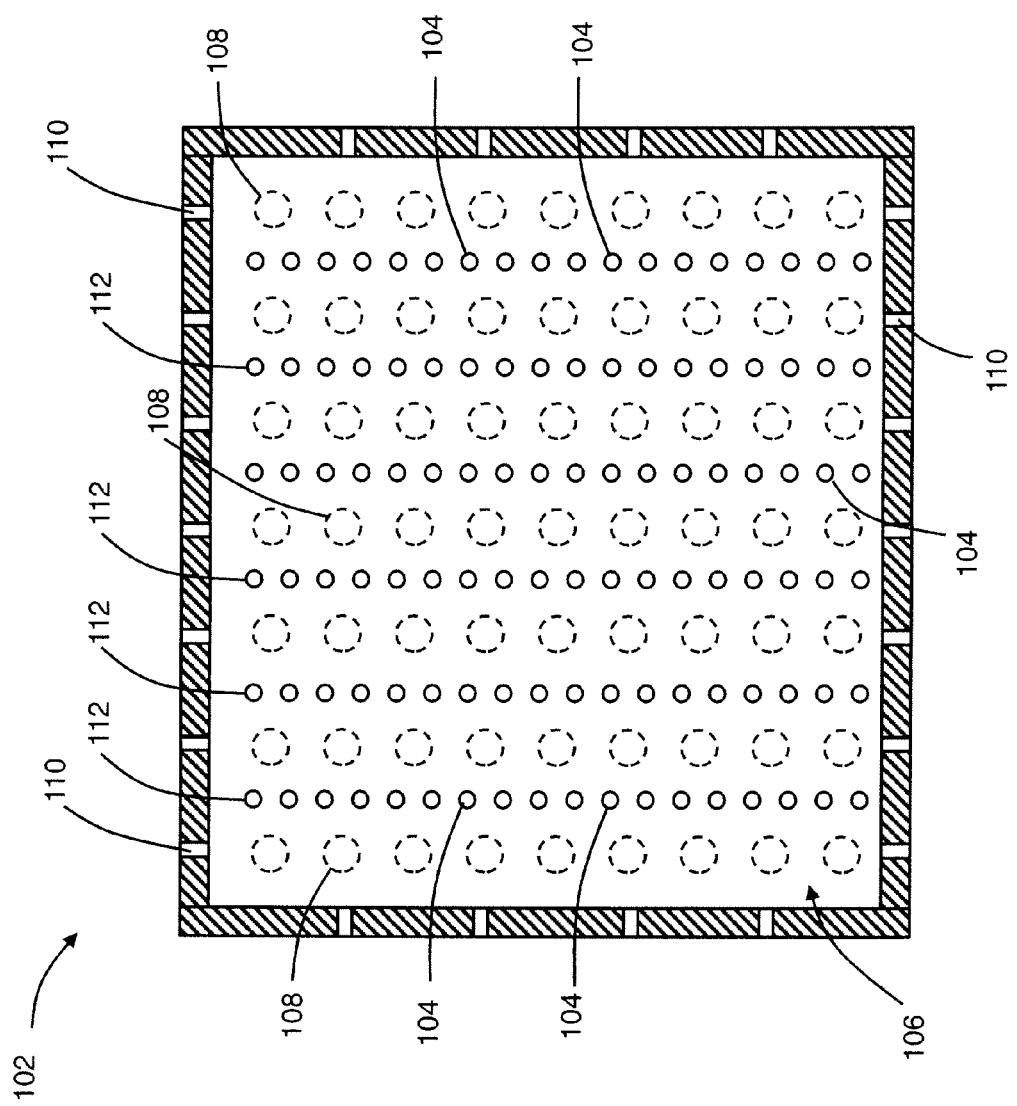
FIG. 1 shows a cross-sectional view of a furnace.

FIG. 1 shows a cross-sectional representation of a furnace 102 with process tubes 104 positioned within an interior area 106 of furnace 102. Furnace 102 may be a steam methane reformer, methanol reformer, ethylene cracker, platformer reheat furnace, radiant heat chamber, or other similar type of furnace, reformer or chamber. Tubes 104 can be positioned in a plurality of rows 112 separated by heating elements or burners 108. In another embodiment, other features, for example, heat exchanger elements and/or other suitable structures, in the interior area 106 of the furnace 102 may be used instead or in addition to tubes 104. Tubes 104 can extend either vertically or horizontally in furnace 102. Burners 108 may be arranged in rows and used to raise the temperature of the interior area 106 of the furnace 102 to a desired temperature to accomplish the process or activity to be performed inside the furnace 102. In one embodiment, the rows of tubes 104 and rows of burners 108 can be substantially parallel. Along the perimeter of furnace 102 are view ports 110 that permit tubes 104, burners 108 and any other structure or feature inside furnace 102 to be viewed and/or analyzed from a point exterior to the furnace 102. In one embodiment, pairs of view ports 110 can be positioned on the perimeter of the furnace 102 at opposite ends of a row of burners 108.

Furnace 102 may have view ports 110 at one or more levels or elevations. Having view ports 110 at more than one level permits greater viewing capability of the tubes 104.

The process begins by taking a series of digital images of the tubes 104 in furnace 102 through view ports 110. The digital images may be taken by a digital camera or any other device capable of capturing digital image information. The digital images may be obtained by pointing the digital camera through each view port 110 and then capturing the corresponding image information, i.e., "taking a picture" of the corresponding portion of the interior area.

In one embodiment, the digital camera may be positioned on a monopod or other similar device to attempt to maintain desired pitch, yaw, and roll angles in the digital images and to assist in positioning the lens of the camera in the center of view port 110. Further, the camera may be set to a manual mode for maintaining a more consistent aperture speed and the focus may be set to infinity.

Figure 2:
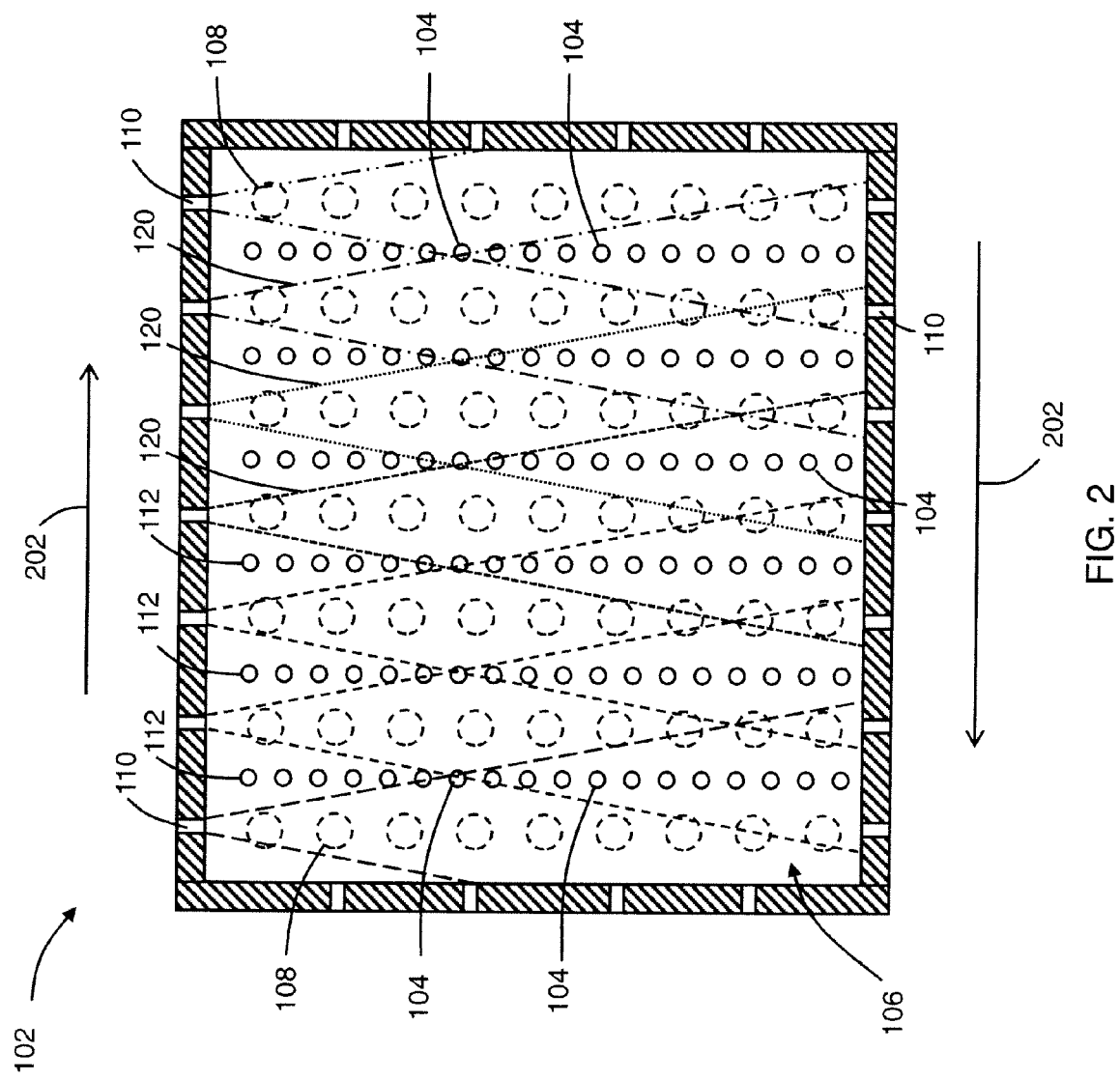
FIG. 2 shows a representation of the fields of view of a camera used to acquire image data from the furnace.

To obtain an image of the interior area 106 of the furnace 102, which includes the tubes 104, the camera may be briefly placed up to a view port 110 with the operator pointing the camera through the view port 110 and subsequently depressing the shutter button to capture the image and then removing the camera from view port 110. FIG. 2 shows the fields of view 120 of the camera when taking images from several view ports 110. As can be seen in FIG. 2, each field of view of the camera includes a portion of one or more rows of tubes 104. The period of time that the camera is pointing through the view port 110 should be minimized to protect the camera and operator from excessive radiant heat exposure; however, the camera should not be moving when the shutter button is being depressed to ensure that the image is not blurred. The procedure can be repeated for every view port 110 on the perimeter of furnace 102.

The camera may capture an image (or multiple images) through the view port of a portion of the interior area 106 of the furnace 102. The image may include a row of tubes 104 located along the left side of the image and another row of tubes 104 located along the right side of the image. In addition, the image may include an opposing view port. The opposing view port may be used to capture an image from the opposite wall of furnace 102. In one embodiment, the image may include other structures and/or features of the interior area 106 of the furnace 102 that are within the field of view of the camera.

In another embodiment, the portion of the interior area 106 captured in an image may overlap or include similar portions of the interior area 106 captured in other images. Stated differently, the portion of the interior area 106 shown in one image may include structures or features that are also shown in other images. For example, images taken from adjacent viewports 110 may show opposite sides of the same tube 104. Similarly, images taken from opposite viewports 110 may show the same tube 104 at different angles. Furthermore, the images are not required to correspond or map to specific or exclusive regions of the interior area 106 and may show substantially similar regions or portions of the interior area 106. In still another embodiment, an image shows a different portion of the interior area 106, if the image includes one structure or feature that is not shown in another image or shows the same structures or features at different angles or perspectives than the other images.

In one embodiment, images of the interior area 106 and tubes 104 from each view port 110 can be captured according to a predetermined sequence or along a predetermined path 202 around the perimeter of the furnace 102 as shown in FIG. 2. Predetermined path 202 can extend in either a clockwise or counter-clockwise direction. By capturing images in a predetermined sequence, the subsequent identification of the portion of interior area 106 captured in each image can be quickly accomplished since each step of the sequence or path corresponds to a known portion of interior area 106. In another embodiment, images of interior area 106 and tubes 104 can be taken in any desired order or sequence with the additional requirement that the corresponding portion of interior area 106 be correlated with the captured image. Since furnace 102 can include view ports 110 on opposite sides of furnace 102 and on each side of a row of tubes 104, all of the tubes 104 can be included in at least two images and many of the tubes 104 can be included in at least four images.

In one embodiment, a single camera is used to capture all of the images of the interior area 106 of the furnace 102. Utilizing the single camera to capture all of the images may increase the consistency of subsequent processing and analysis of the image data because the images are captured under uniform camera conditions such as uniform signal to noise levels and uniform sensitivities to different wavelengths. In another embodiment, a plurality of cameras may be used to capture images, but subsequent processing and analysis of the image data should account for differences in the camera conditions such as differences in the sensitivities to different wavelengths and the differences in signal to noise ratios as a result of differences in conditions between cameras and/or models of cameras. The accounting for differences in camera conditions is needed to make image data acquired from one camera correspond with image data acquired from another camera.

When capturing an image of the interior area 106 of the furnace 102, the camera can include one or more filters to prevent or reduce certain wavelengths of light from reaching the imager or sensor. The image or sensor can include charge-coupled devices (CCDs) and/or complementary metal-oxide semiconductor (CMOS) devices. In one embodiment, the filter can be designed to permit 50% of the light at a predetermined wavelength to pass through the filter and reach the sensor. The filter is further designed to permit less light, i.e., less than 50% of the light, to pass through the filter at wavelengths that are less than the predetermined wavelength, and to permit more light, i.e., greater than 50% of the light, to pass through the filter at wavelengths that are greater than the predetermined wavelength. In one embodiment, the predetermined wavelength can be about 715 nm. In other embodiments, the predetermined wavelength can be between about 300 nm or less and/or 1000 nm or more.

The imager or sensor that is incorporated in the camera can include pixels that record the intensity of light received at the pixel. The number of pixels in the camera corresponds to the resolution of the camera. In one embodiment, the camera can have a resolution between about 1 megapixel (approximately 1 million pixels) to about 10 megapixels (approximately 10 million pixels) or more. Each pixel in the imager or sensor can have one or more components or channels that record the intensity of light. In one embodiment, each pixel of the imager or sensor can have three components or channels, which may correspond to red (R), green (G) and blue (B) colors. The channels or components of the pixel can be configured to be more receptive to light at certain predetermined frequencies and less receptive to light at other predetermined frequencies when recording the intensity of light. In other words, light at certain predetermined frequencies can contribute more to the overall intensity measurement than light at other predetermined frequencies. When an image is captured, the recorded intensities for each channel or component of each pixel are stored as image data or pixel data. In one embodiment, the pixels are configured to measure the intensity of light in the visible spectrum.

After the images of the furnace 102 are obtained, the corresponding image data for each of the images may be loaded into a computer or other processing device for additional processing and analysis. Each of the images may then be processed using the computer to correct, i.e., reduce or eliminate, any distortion in the image. Before each image can be processed to correct for distortion in the image, a transformation model to represent each lens and camera combination used to capture images may be constructed or created. To create a transformation model, a series of radial distortion models may be created for the lens and camera combination. A radial distortion model determines the amount of radial distortion that may be introduced by a calibrated lens and camera combination for a selected focal length (accounting for the possibility of a zoom lens) and selected focal distance. Once the transformation model has been created for a lens and camera combination, the transformation model can be applied to the images captured by that lens and camera combination to correct for any distortion. Methods for distortion correction are known in the art. Any suitable method for distortion correction may be used in connection with the present method.

In addition to distortion correction, each of the images may be processed using the computer to correct for any rotation or deviation ("rotation correction") from a specific position, for example, a "centered position." Rotation correction can be performed to correct the vertical orientation of the image ("roll angle"), to correct the "up and down" angle ("pitch") and the "left and right" angle ("yaw"). In one embodiment, the roll angle and pitch can be corrected by detecting the edge(s) of the last tube(s) 104 in the image and the position of the opposite view port 110 and then adjusting the image so the edge(s) of the last tube(s) 104 in the image are vertical. In another embodiment, yaw can be corrected using furnace geometry information. Methods for rotation correction are known in the art. Any suitable method for rotation correction may be used in connection with the present method.

The "corrected" images, may be processed using the computer to detect or determine the edges of the tubes 104 and/or any other desirable features, for example, opposing view port 110, in the image. The detected edges of the tubes 104 and the detected features from the image may be adjusted or modified in view of a geometric model of the furnace 102. A geometric model is a representation of the position in space of each feature in the furnace (typically represented by x, y, z coordinates and a reference point). Based on design specification such as the row spacing, tube-to-tube spacing and the distance between the wall and the first tube, an "as-designed" geometric model can be developed. Due to manufacturing tolerances and tube movement resulting from thermal expansion, the tubes and other furnace features may not be located at precisely the same position as in the "as-designed" geometric model. This model can be subsequently modified to match the actual operating conditions of the furnace by comparing the edges detected in the images to the geometric model. This allows the tubes or other features to be identified.

The geometrical model is used as the starting point to identify each tube. Edge detection is used to fine-tune the location of the feature, because tubes can bow or move in a high-temperature environment.

The edge of the tube banks and location of the view port are estimated based on a modeling scheme that incorporates both the geometrical information and the result of the edge detection from the image. The information of the edge detection from image processing is reconciled with the geometrical data.

The edge detection algorithm or process estimates the possible location of the edges and provides a probability distribution of where each edge may be located. The probability distribution of the location of the edge is compared with the geometrical model. Since there are multiple edges that are located at the same time, the error between the geometrical information and the probability density of the location of the edges are minimized to derive the final location of the edges.

Using the geometric model and the identified tube edges and other features, each tube 104 in each image may be identified and segmented. Starting with the detected edge of the last tube 104 in a row, a grid may be overlaid onto a portion of the image corresponding to the tube row. The grid may be unevenly spaced and may be based on dimensions and configuration from the geometric model such as the tube row spacing and tube center distance. The vertical lines of the overlaid grid correspond to the edges of tubes 104 based on known positions of tubes 104 from the geometric model. The spacing between the grid lines can vary from 1 pixel to 100 or more pixels depending on the resolution of the camera used. The grid may include a row of segments having a predetermined length and/or height. The segments may be centered around a predetermined elevation.

Each segment of the row of segments is then checked to determine if the segment is part of a tube 104 or is another part of the interior area 106 as part of outlier or defect detection. If a segment is not part of a tube 104, the segment is discarded. The remaining segments, which correspond to tubes 104 in furnace 102, are then used in the analysis to determine a temperature of each of the tubes 104 in the corresponding image. In one embodiment, the method used to determine outliers or whether a segment is part of a tube is based on a classification tree. The classification tree is developed using information from the geometric model. A series of different statistics are tested for a segment and based on the result of the tests, a segment is determined to be good (part of a tube) or bad (not a tube).

The temperature of the tubes 104 is determined based on the pixel data from all of the images. To determine a temperature value for a tube 104 in an image, the pixel data in the segment of the corresponding tube 104 is processed to determine a value representing a measure of central tendency, which is then correlated to a temperature. The temperature or temperature value is a representative value for a tube. The tube temperature varies along its length and one or more selected elevations are measured to provide representative temperature value(s) for a tube. The processing of the pixel data, for example, intensity values, begins with obtaining a value representing a measure of central tendency, for each channel or component, from the pixel data of the pixels in the segment. In one embodiment, the value representing a measure of central tendency can be a median of the pixel data. However, in other embodiments, the value representing a measure of central tendency may be a mean, robust mean, mode or other statistical measure derived from the pixel data. The value representing a measure of central tendency for each channel or component is then correlated to a temperature value. In one embodiment, the temperature value for a segment determined from the value representing a measure of central tendency can also be assigned an uncertainty value. The uncertainty value can quantify the confidence in the determined temperature value. Numerous factors such as the distance of the tube from the camera (path length, "d"), the camera angle (formed by a center line of the camera and the position of tube 104, "a"), the number of pixels in the segment representing the tube, can affect the confidence of a temperature value determination. If the pixel data includes multiple channels or components, the temperature value for each of the channels or components can be averaged using a statistical averaging technique, for example, average, weighted average, etc., to obtain a single temperature value for the segment, which corresponds to a tube 104.

To obtain a correlation between temperature values and the pixel data, a relationship between known temperatures and pixel data may be formed and stored in a database or other memory device for accessibility in the future. One technique to obtain the relationship between pixel data and temperature involves capturing an image of the interior area 106 and then soon thereafter following the image capture with the acquisition of temperature measurements of the tubes in the portion of the interior area corresponding to the image. The temperature measurements of the tubes may be performed with an optical pyrometer or other suitable device. The values representing a measure of central tendency from the image, which correspond to tubes 104, are then compared to the temperature measurements to establish a correlation or relationship between temperature and pixel value. Other techniques to obtain temperature information on the tubes 104 can also be used to establish the relationship or correlation to pixel values. Once a relationship or correlation between temperatures and pixel values is established, the correlation can be used for subsequent processing of images.

Once the temperature values for each tube 104 in each image is determined, the temperature values from the images can be combined together to provide temperature information on all the tubes 104 in furnace 102. The temperature value from each tube 104 in each image is extracted and used to generate a representation of temperature information for all of the tubes 104 of the furnace 102. Where a particular tube 104 has several temperature values as a result of the tube 104 being in more than one image, the temperature values may be averaged using a statistical averaging technique, for example, average, weighted average, etc. The uncertainty of the temperature values may be included as a factor when calculating a weighted average. Once the extraction and processing of the temperature values from the images is complete, a temperature value for each tube 104 in the furnace 102 may be displayed.

In another embodiment, instead of determining a temperature value for each tube 104 in each image, the segment pixel data or the values representing a measure of central tendency can be continued to be processed in a manner similar to that discussed above (including the application of uncertainty values) to generate a representation of the furnace 102 in pixel data or statistical values. The pixel data or values representing a measure of central tendency in the representation of the furnace can then be converted to temperatures using the relationship or correlation discussed above to obtain a representation of the furnace based on temperature values.

In one embodiment, a multivariate regression method (such as Partial Least Squares) can be used to establish a correlation between the temperature of the specific tubes for which independent temperature measurements are available and the pixel data from an image. The correlation can incorporate variables including, but not limited to, channel pixel values, for example, R, G, B values, d, a, other suitable quantifiable measurements, and/or combinations thereof. For example, the correlated value of the tube temperature can be represented as $\hat{T}_j$ (for tube j) and the independent variables as $x_{ij}$, where i denotes the $i^{th}$ variable, from a partial list of variables where $$x \in \left\{R, G, B, 1/d, \frac{1}{d^2}, \alpha, \dots \right\}.$$

Other variables associated with the tube temperature may include the R, G, B of the previous and next tubes. The tube 104 temperature at a predetermined location can be represented as a linear combination of these variables with unknown coefficients $A_i$ such that $\hat{T}_j = \Sigma A_i x_{ij}$. Given a set of independent temperature measurements, $T_j$, where j=1, 2, ... , n, which can come from a pyrometer, the unknown coefficients can be determined by minimizing the error between the actual data and the prediction in the least squares sense:

$$\underset{j=1,n}{\mathrm{Min}}\{(T_j - \hat{T}_j)^2\} = \underset{j=1,n}{\mathrm{Min}}\left\{\left(T_j - \sum_i A_i x_{ij}\right)^2\right\}.$$

These evaluations can be systematically performed with the aid of standard statistical and mathematical software tools (for example, Matlab®). The final result of the evaluations can generate a correlation between data from image and temperatures of tubes 104 in the least squares sense $\hat{T} = \Sigma A_i x_i$ allowing temperature estimates for all tubes in the images (not just those for which independent temperature measurements are available).

Figure 3:
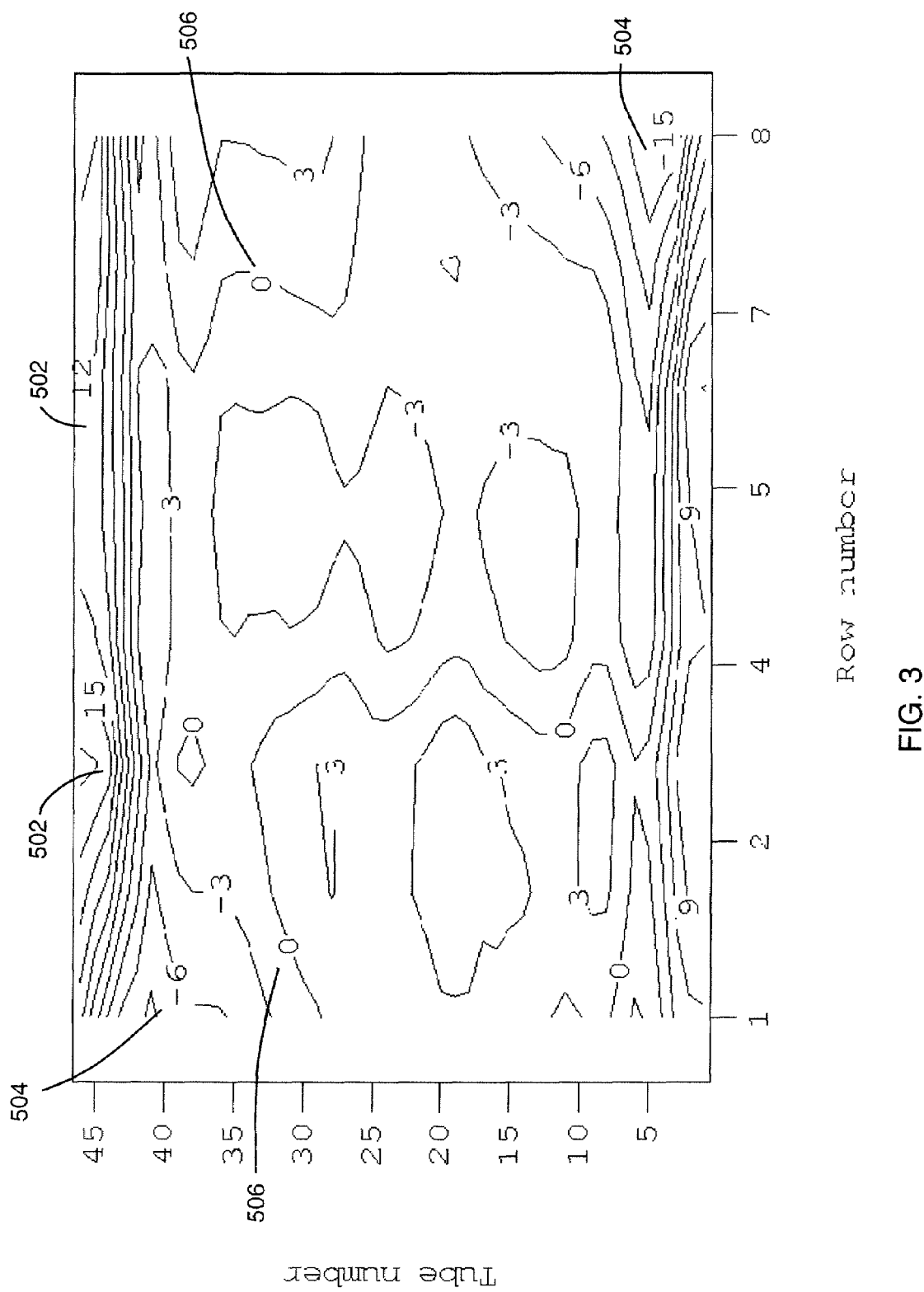
FIG. 3 shows an exemplary contour plot of temperature differences for a predetermined elevation of a furnace.

Referring to FIG. 3, temperature information regarding the tubes 104 of furnace 102 may be displayed as a contour plot or other suitable (color) graphic representation. FIG. 3 shows an exemplary contour plot of temperature difference information for the tubes 104 of a furnace 102 at a predetermined elevation. The plot can identify individual process tubes and rows. As shown, the plot illustrates that the furnace includes regions of above-average temperature 502, regions of below-average temperature 504, and regions of average temperature 506.

In one embodiment, the process disclosed herein may be applied to a plurality of elevations within furnace 102 and may be used to generate a three-dimensional view or representation of temperature data. View ports 110 can be located in upper and lower portions of furnace 102. Performing the process discussed above with both view ports in the upper and lower portions of furnace 102 permits the generation of a plot for the upper portion and the lower portion of furnace 102. In one embodiment, additional calculations incorporating anticipated differences in temperature at the various elevations are incorporated to the three-dimensional plot. Incorporating the anticipated differences in temperatures permits the plot to account for anomalies with specific tubes 104. In another embodiment, multiple rows of segments at different elevations can be analyzed from images. The use of multiple segments at different elevations can also be used to generate a three-dimensional representation of temperature information.

In one embodiment, the process disclosed herein may be used to acquire the temperature of other structures or features that can be located in a furnace or chamber 102 such as vertical walls and ceilings. Upon processing the image data from images, the temperature of the structures of the furnace 102 may be determined by correlating the measured temperature of the structures within the furnace 102 to statistical values corresponding to the features. This is done in a method that is similar to that described above for the tubes. These features may have different radiative properties than those of the tubes requiring a different set of correlating parameters ($B_j$ rather than $A_j$). It is necessary to determine values of these unknown coefficients from independent temperature measurements.

Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method for determining temperature information on a plurality of tubes in a furnace, the method comprising:
   capturing a plurality of images of an interior area of a furnace, at least some images of the plurality of images being associated with different portions of the interior area of the furnace, and wherein each image of the plurality of images comprises pixel data associated with a subset of the plurality of tubes positioned inside the furnace;
   identifying each tube of the subset of the plurality of tubes in each image of the plurality of images;
   processing a portion of the pixel data associated with each identified tube to obtain a value representing a measure of central tendency for each identified tube of the subset of the plurality of tubes in each image of the plurality of images; and
   processing the value representing the measure of central tendency for each identified tube to obtain temperature information for the plurality of tubes.

2. The method of claim 1 wherein the processing the value representing the measure of central tendency for each identified tube comprises determining a temperature value for each identified tube from the corresponding value representing the measure of central tendency for each identified tube.

3. The method of claim 2 further comprising:
   establishing a correlation between previously obtained values representing measures of central tendency and corresponding measured temperatures; and
   wherein determining the temperature value for each identified tube from the corresponding value representing the measure of central tendency uses the correlation.

4. The method of claim 2 wherein the processing the value representing the measure of central tendency for each identified tube further comprises:
   determining tubes of the plurality of tubes having a plurality of corresponding determined temperature values; and
   processing the plurality of corresponding determined temperature values for each determined tube of the plurality of tubes to obtain a single temperature value for each determined tube.

5. The method of claim 1 further comprising generating a geometric model of the plurality of tubes positioned in the furnace.

6. The method of claim 1 wherein the identifying each tube comprises:
   identifying an edge of a tube of the plurality of tubes; and
   overlaying a grid on the corresponding image using a geometric model of the plurality of tubes positioned in the furnace and the identified edge of a tube.

7. The method of claim 4 wherein the overlaying a grid comprises assigning grid lines to correspond to edges of each tube of the plurality of tubes in the corresponding image.

8. The method of claim 5 wherein the processing a portion of the pixel data comprises:
   identifying a segment of the grid corresponding to each identified tube; and
   processing the pixel data associated with the identified segment to obtain the value representing the measure of central tendency for the corresponding identified tube.

9. The method of claim 6 wherein the identifying a segment of the grid comprises identifying segments located at a predetermined elevation of each identified tube.

10. The method of claim 1 wherein:
    the pixel data comprises data for a plurality of channels; and the processing a portion of the pixel data comprises processing the data for each channel of the plurality of channels to obtain a channel value for each channel of the plurality of channels.

11. The method of claim 10 wherein the processing a portion of the pixel data comprises processing the channel values for the plurality of channels to obtain the value representing the measure of central tendency for the identified tube.

12. The method of claim 1, wherein the processing the value representing the measure of central tendency for each identified tube to obtain temperature information comprises generating a value representing the measure of central tendency for each identified tube at a plurality of elevations.

13. A method for acquiring temperature data for a plurality of features in a chamber, the method comprising:
   capturing a first image of an interior area of the chamber, the first image being associated with a first portion of the interior area, and wherein the first image comprises first image data for the plurality of features positioned within the interior area;
   capturing a second image of the interior area of the chamber, the second image being associated with a second portion of the interior area, and wherein the second image comprises second image data for the plurality of features positioned within the interior area;
   identifying the plurality of features within the first image data and the second image data;
   generating an interior area representation based on the first image data, the second image data, and the identification of each feature of the plurality of features in the interior area, wherein the interior area representation comprises data relating to the plurality of features positioned inside the interior area;
   establishing a correlation between the interior area representation and temperature information related to the interior area; and
   calculating temperatures of the plurality of features in the interior area from the interior area representation using the established correlation.

14. The method of claim 13, wherein the generating an interior area representation comprises:
   determining each feature of the plurality of features having a plurality of calculated values;
   generating a consolidated value for each determined feature of the plurality of features based on the plurality of calculated values for the corresponding determined feature; and
   wherein the interior area representation comprises the consolidated value for each determined tube of the plurality of features.

15. The method of claim 14 further comprising:
   associating the first image data to a corresponding identified feature in the first image; and
   calculating a value for each identified feature in the first image using the associated first image data.

16. The method of claim 15, wherein the generating an interior area representation comprises generating an interior representation at a plurality of elevations within the chamber.

17. The method of claim 15, further comprising generating and displaying a three-dimensional plot of the temperature information.

* * * * *